(12) United States Patent
Frolo et al.

(10) Patent No.: US 6,505,889 B2
(45) Date of Patent: Jan. 14, 2003

(54) AUTOMOBILE VEHICLE SEAT INCLUDING HINGE MECHANISMS CONNECTED IN ROTATION BY A CONNECTING BAR

(75) Inventors: Ludovic Frolo, Amilly (FR); Jean-Luc Le Brestec, Chateauneuf sur Loire (FR)

(73) Assignee: Faurecia Sieges d'Automobile S.A., Boulogne (FR)

( * ) Notice: Subject to any disclaimer, the term of this patent is extended or adjusted under 35 U.S.C. 154(b) by 0 days.

(21) Appl. No.: 09/805,371

(22) Filed: Mar. 14, 2001

(65) Prior Publication Data

US 2002/0125755 A1 Sep. 12, 2002

(30) Foreign Application Priority Data

Mar. 21, 2000 (FR) ............................................. 00 03566

(51) Int. Cl.[7] .................................................. B60N 2/22
(52) U.S. Cl. ............... 297/354.12; 297/367; 297/463.2; 297/452.18
(58) Field of Search ............................... 297/354.1, 362, 297/367, 463.1, 463.2, 354.12, 452.18

(56) References Cited

U.S. PATENT DOCUMENTS

| 4,290,647 A | * | 9/1981 | Hensel et al. ............ 297/354.1 |
| 4,629,252 A | * | 12/1986 | Myers et al. ................ 297/367 |
| 5,536,217 A |   | 7/1996 | Droulon et al. |
| 5,547,254 A | * | 8/1996 | Hoshihara .................... 297/367 |
| 5,749,624 A | * | 5/1998 | Yoshida .................... 297/463.1 |
| 6,024,410 A | * | 2/2000 | Yoshida .................... 297/354.1 |

FOREIGN PATENT DOCUMENTS

| DE | 40 23 824 | 2/1992 |
| FR | 2406409 | 5/1979 |

\* cited by examiner

Primary Examiner—Peter R. Brown
(74) Attorney, Agent, or Firm—Connolly Bove Lodge & Hutz LLP

(57) ABSTRACT

An automobile vehicle seat includes two hinge mechanisms, each with a center of rotation through which a common pivoting geometrical axis passes. The hinge mechanisms are connected in rotation by a connecting bar extending, in a range between coaxial and parallel, to the pivoting geometrical axis. The connecting bar including a plurality of flattened zones offset axially relative to one another and located along the bar, the flattened zones are positioned at respective angular planes in relation to the bar axis and serving to increase bar flexibility in the flattened zone thereby reducing stress in the mechanisms.

5 Claims, 2 Drawing Sheets

AUTOMOBILE VEHICLE SEAT INCLUDING HINGE MECHANISMS CONNECTED IN ROTATION BY A CONNECTING BAR

FIELD OF THE INVENTION

This invention concerns automobile vehicle seats including hinge mechanisms connected in rotation by a connecting bar.

BACKGROUND OF THE INVENTION

Such hinge mechanisms are currently used to make an adjustable connection which can be locked in position between the seat pan and the reclining backrest of the seat. These mechanisms can be of different types according to the principle used to control the backrest tilt angle adjustment.

Systems, especially called "continuous hinges" ensure both the locking in position and the adjustment, for example by a gear system installed inside a hinge mechanism housing and controlled by a rotary control knob installed on the side of the seat. Such systems are described for example in documents FR-2706380 and DE-4023824.

The hinge mechanisms are placed on the pivoting axis of the backrest in relation to the seat pan, on each side of the seat, between the seat pan framework flange and a backrest framework flange. These mechanisms conventionally include, as shown in FR-2706380, a housing attached for example to the seat pan flange, and a cup, installed so as to pivot on the housing and attached to the backrest flange. To ensure synchronisation of the control between the hinge mechanisms, these are, in a known manner, connected by a rigid synchro bar which can be coaxial with the mechanisms and the hinge axis of the backrest in relation to the seat pan or offset in relation to this axis as shown in DE-4023824.

The connection between the synchro bar and the hinge mechanisms can be rigid. For instance, the hinge mechanism which is located on the side of the seat where the backrest adjustment control is located includes a shaft protruding on each side of the mechanism, especially towards the outside of the seat, to install the control knob. The said synchro bar can then be welded to the other end of the shaft of the mechanism, opposite the control knob and oriented towards the inside of the seat. On the other side of the seat, the connection is generally ensured by a splined end on the bar or a drive square which engages into a splined hole or a corresponding female square in the hinge mechanism.

BACKGROUND OF THE INVENTION

Due to various geometrical defects inevitable during the manufacture and the assembly of the frameworks of the backrest and the seat pan, exact coaxiality between the two hinge mechanisms is often not obtained. The pivoting axis of the backrest in relation to the seat pan is a geometrical axis passing via the centre of the two mechanisms, but the axes of each of the mechanisms themselves may be offset or form a slight angle between them. Also, the synchro bar may not be perfectly straight. The result is that during the controlled rotation of the bar, stresses are induced either in the hinges or in the links between hinges and synchro bar, and the stresses can vary according to the relative position of the seat pan and backrest framework flanges and therefore according to the backrest tilt angle. The functional clearance which may exist between the splined end of the shaft and the hinge mechanism in which it is fitted may allow a part of the above mentioned coaxiality defects to be absorbed but is however insufficient and substantial variations in the operating torque result affecting the flexibility of the backrest tilt angle control.

The aim of this invention is to solve this problem and to provide a hinge system the control of which is as light as possible that is with a torque as low and as constant as possible without sudden variations or peaks during the operation.

With these targets in mind, the subject of the invention is an automobile vehicle seat including two hinge mechanisms each with a centre of rotation via which a common pivoting geometrical axis passes, the hinge mechanisms being connected in rotation by a connecting bar extending more or less coaxially with or parallel to the said pivoting axis characterised in that this connecting bar includes at least one flattened longitudinal zone to provide the bar in the said zone with increased flexibility in relation with the rest of the bar. Whereas the bar has a general circular section giving it bending characteristics determined by its dimensions and the material of which it is made, the flexibility of the bar in each flattened zone is considerably increased in the direction orthogonal to the general plane of the said flattened zone without necessarily affecting to a great extent the torsion strength of the said bar.

Thus, during its rotation and especially during the variation of the tilt angle of the backrest caused by the controlled rotation of the bar, the increased flexibility of the bar in the flattened zone provides an overall flexibility which in a way allows the coaxiality defects of the two hinge mechanisms to be absorbed and therefore reduces the stresses exerted on these mechanisms and therefore the rotation control forces.

This reduction in stresses is especially noticeable when, preferentially, the bar includes several flattened zones, offset axially along the bar and in different angular planes around bar axis. According to a specific arrangement, the bar includes two flattened zones, offset axially along the bar and with different orthogonal planes. The combination of the flexibilities of the flattened zones acts then in the same way as a universal joint connecting the parts of the bar located axially on either side of the flattened zone facilitating the rotation of the bar when the coaxiality defects of the articulation mechanisms cause the connecting bar to bend.

According to a specific arrangement of the invention, the bar consists of a tube and the flattened zone or zones are formed by crushing the said tube, the section of the material in the flattened zone remaining the same as in the rest of the bar. Preferentially, the flattened zone includes a hole, drilled more or less in the centre of the flattened zone, perpendicular to the general plane of the said flattened zone. The section of the bar at the hole is then reduced and increases the flexibility—the larger the hole the greater the flexibility—but without however significantly reducing the torsion strength characteristics. In other words, the hole allows a high increase in the flexibility of the rotational control without significantly reducing the transmissible torque.

In common practice, the hinge mechanism located on the side of the seat including the manual control knob or lever itself includes a shaft one end of which accommodates the said knob or the said lever and the other end, facing towards the other mechanism, is solidly attached, for example by a weld, to an end of the connecting bar. In this case, the flattened zone or zones are located in the vicinity of the said end therefore in the vicinity of the most rigid section of the bar to limit as far as possible the displacements of the bar when it rotates with a coaxiality defect at its ends.

BRIEF DESCRIPTION OF THE FIGURES

Other characteristics and advantages will appear in the description which will be given of a seat framework including backrest-to-seat pan hinge mechanisms attached by a connecting bar in compliance with the invention.

Refer to the appended drawings on which.

DETAILED DESCRIPTION OF THE INVENTION

Figure 1:
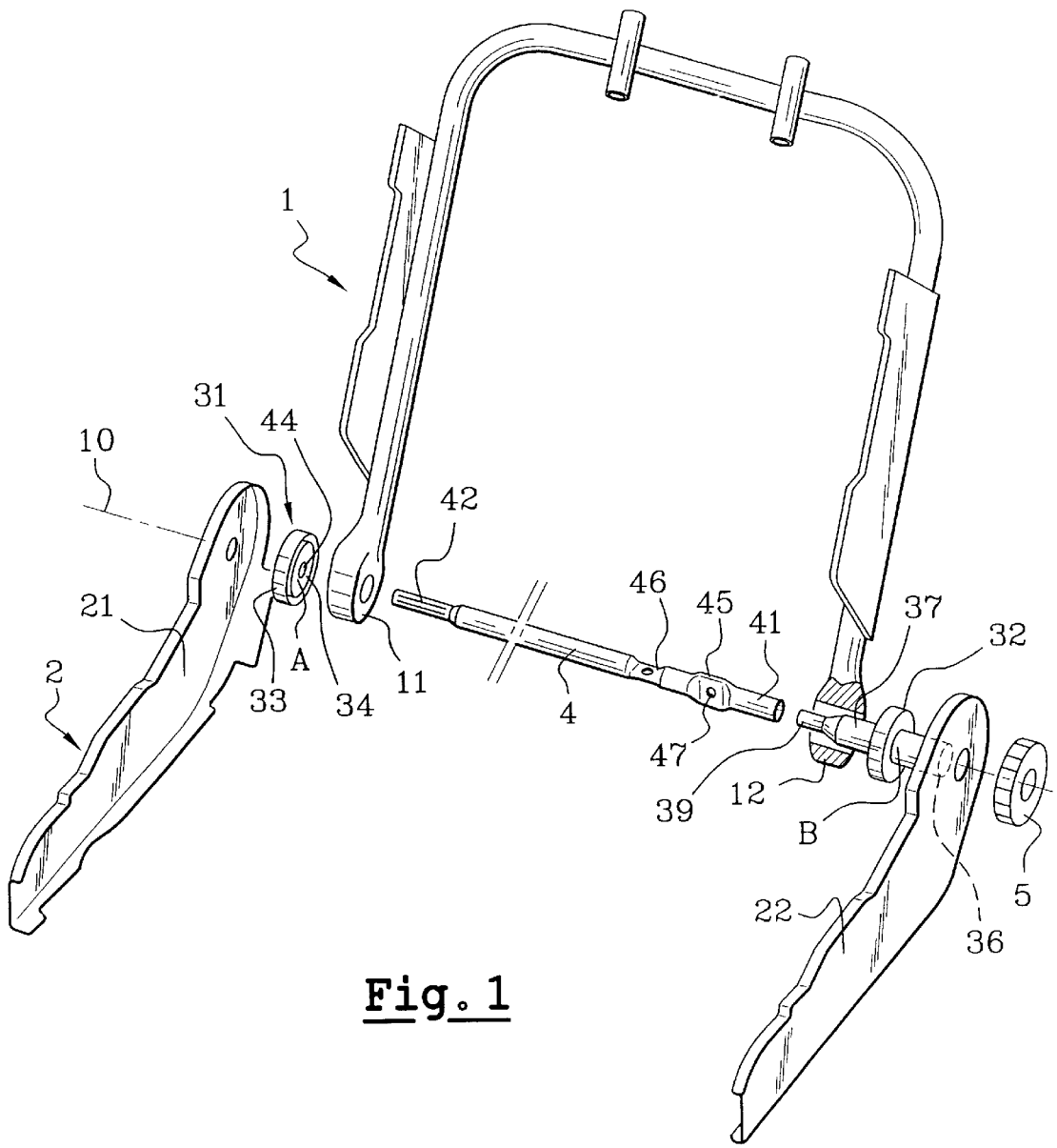
FIG. 1 is a partial and exploded perspective view of such a seat framework.

The drawing on FIG. 1 shows a schematic view of a backrest framework 1 and two side flanges 21, 22 which, attached by crossmembers or other similar structural elements, not shown, comprise a seat pan framework 2. The backrest framework 1 includes, on each side, on the bottom, backrest side flanges 11, 12. The backrest framework is connected to the seat pan framework by hinge mechanisms 31, 32, placed respectively between the seat pan flanges 21, 22 and the backrest flanges 11, 12 and which define a geometrical axis 10 for the pivoting of the backrest in relation to the seat pan. The hinge mechanisms 31, 32 are of a type known itself, such as, for example, as shown in the above-mentioned document FR-2706380. Each mechanism especially includes a housing 33 and a cup 34 rotating in relation to the housing between which the mechanical elements, not shown, are placed enabling controlled rotation of the cup to be ensured in relation to the housing around a central axis 35, 38 of the mechanism, and relative locking in any position determined by the user. The housing 33 of each hinge mechanisms 31, 32 is solidly attached, for example by welding, to the seat pan flange 21, 22, and the cup 34 is attached in a similar manner to the backrest flange 11, 12, or vice versa.

Points A and B shown on the drawings comprise the respective rotational centres of each hinge mechanism which define the backrest pivoting geometrical axis 10 to adjust the tilt angle of the backrest in relation to the seat pan. This adjustment is obtained for example by a knurled knob 5, located on the side of the seat, installed on the outer end 36 of a control shaft 37 of the hinge mechanism 32, this shaft having rotational axis 38.

A connecting shaft 4, consisting for example of a metallic tube, connects the two hinge mechanisms in the following way:

a female end 41 of the connecting shaft 4 is solidly attached, for example by fitting and welding 43, to the end 39, opposite the knob 5, of the control shaft 37 of the hinge mechanism 32;

the other end 42 of the shaft 4 has a square or splined shaped section and is inserted into a hole 44 with a section corresponding to the control element at the centre of the hinge mechanism 31.

Thus, in a manner known itself, the backrest tilt angle is adjusted by the user who, by turning the knob 5, controls the mechanism 32 directly and the mechanism 31 by synchronism by means of the connecting shaft 4. To replace the manual control, the rotation of the hinge mechanism control shafts can be motorised.

To prevent the non-alignment of axes 35 and 38 of the two hinge mechanisms 31 and 32 from generating prohibitive stresses during the rotation of the connecting shaft as indicated at the start of this paper, the said connecting shaft 4 has, in compliance with the invention, at least one flattened zone. In the example shown, the shaft 4 has two flattened zones 45, 46, offset along the shaft and in angular planes offset in relation to each other by 90°.

These flattened zones are obtained for example by simply crushing the tube comprising the bar 4.

Figure 2:
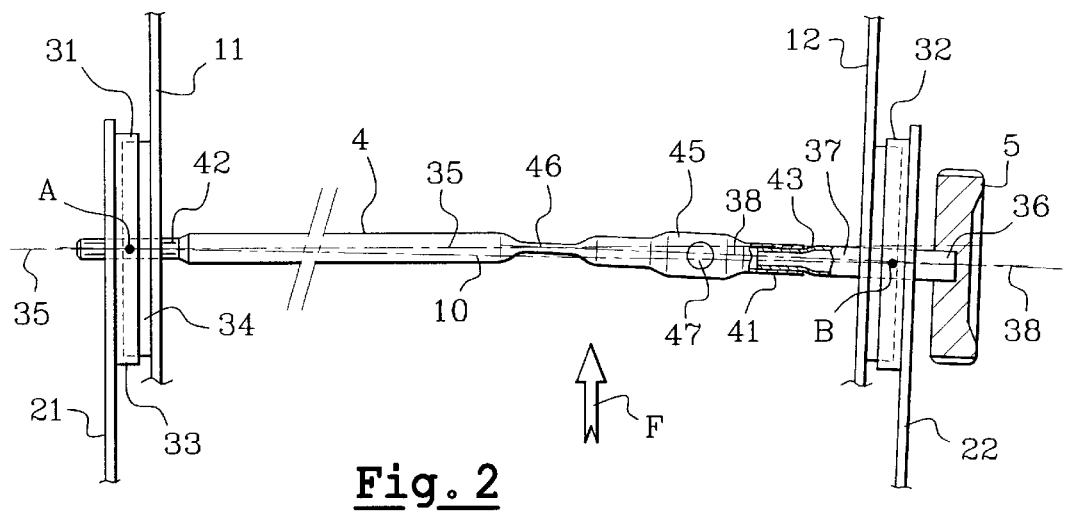
FIG. 2 is a partial front view of the bar in place between the offset hinge mechanisms.
Figure 3:
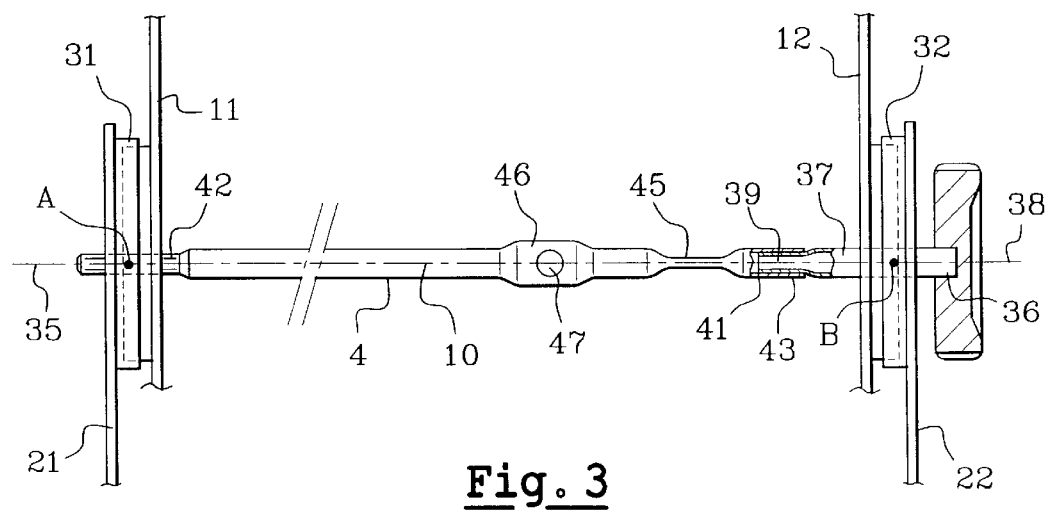
FIG. 3 is a corresponding view along arrow F of FIG. 2.

As can be seen on FIG. 2, parallelism defects in the framework flanges lead to coaxiality defects in the hinge mechanisms, the angle between the geometrical axes 35 and 38 being voluntarily exaggerated on the drawing to make it easier to understand. The result is that the connecting bar between the two mechanisms is in a way bent in relation to the backrest pivoting geometrical axis 10. This bending of the shaft cannot be avoided. However, the flattened zone 46 comprises an almost flat section, more flexible than the rest of the tube comprising the shaft 4, and where all bending imposed on shaft 4 is concentrated. The same applies to the flattened zone 45 when the shaft 4 is turned through a quarter of a turn around itself. Overall, the increased flexibility of the shaft 4 in the flattened zones facilitates the curved deflection of the said shaft when ends 41 and 42 are forced to be non-coaxial due to the coaxiality defect of the hinge mechanisms.

The flattened zones are preferentially located on the side where the rigidity is the higher at the connection between the connecting bar and the mechanism, that is, in the example shown, on the RH side, where the weld connecting shaft 4 to shaft 37 of mechanism 32 makes the end 41 of the said connecting shaft more rigid in relation to the frameworks than the other side where the sliding fit of the square 42 in the hole 44 benefits from a certain functional clearance. As can be easily understood, this arrangement allows the amplitude of the displacement of the connecting shaft 4 around the theoretical rotational axis 10 to be limited when it rotates.

The flexibility of the flattened zones can be improved still further, without significantly reducing the torsion strength of the bar, by making, in the flattened zones, holes 47 of a suitable diameter, the dimension of which can be optimised experimentally to obtain the best trade-off between flexibility and torsional strain.

Due to this increased local flexibility, the operating torque is no longer submitted to sudden variations during rotation and its average value and maximum value are considerably reduced, making the control much lighter. As a comparative example, the inventors were able to observe a reduction in the maximum measured torque from 4 Nm with the use of a connecting bar according to the earlier state of art, formed from a steel tube of continuous circular section over its length, of 10 mm in diameter and with a wall thickness of 1 mm, to 2.9 Nm after implementing the invention on this tube, in a framework setup with the same geometrical fault characteristics.

The invention is not limited to the design described above only as an example. In particular, the number, the shape and the layout of the flattened zones along the length of the shaft, and their angular layout, could be modified to suit as best as possible the specific configurations of various seats. For example, the set of two flattened zones in the example above could be completed by a second similar set but located on the other end of the shaft to limit still further the deformation stresses, the whole then behaving in the same way as a double universal joint transmission line. The type of hinge mechanism given as an example is also not restrictive, the invention could be used whenever it is necessary to transmit a control torque between the two sides of the seat, while remaining within axial misalignments limited to, for example, several degrees between the ends of the shaft.

What is a claimed is:

1. An automobile vehicle seat comprising:

two hinge mechanisms, each with a center of rotation through which a common pivoting geometrical axis passes;

the hinge mechanisms being connected in rotation by a connecting bar extending, in a range between coaxial and parallel, to said pivoting geometrical axis;

the connecting bar including a plurality of flattened zones offset axially relative to one another and located along the bar, the flattened zones being positioned at respective angular planes relative to one another in relation to a bar axis and serving to increase bar flexibility in the flattened zones thereby reducing stress in the mechanisms.

2. Seat in accordance with claim 1 wherein the bar includes two flattened zones offset axially along the bar, the flattened zones located in respective orthogonal planes relative to one another.

3. Seat in accordance with claim 1 wherein the bar comprises a tube and the flattened zones are formed by crushing said tube.

4. Seat in accordance with claim 1 wherein each flattened zone includes a hole and serving to further increase bar flexibility in the flattened zone thereby further reducing stress in the mechanisms.

5. Seat in accordance with claim 1 wherein the bar has an end solidly attached to a shaft of one of the hinge mechanisms, and the flattened zones are located in the vicinity of said end.

* * * * *